United States Patent
Inoue et al.

(10) Patent No.: US 6,681,178 B1
(45) Date of Patent: Jan. 20, 2004

(54) NAVIGATION APPARATUS

(75) Inventors: Koichi Inoue, Tokyo (JP); Masatsugu Norimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/030,816

(22) PCT Filed: Jun. 7, 2000

(86) PCT No.: PCT/JP00/03699

§ 371 (c)(1),
(2), (4) Date: Jan. 14, 2002

(87) PCT Pub. No.: WO01/94889

PCT Pub. Date: Dec. 13, 2001

(51) Int. Cl.[7] ......................... G06F 165/00; G06F 15/62
(52) U.S. Cl. ......................... 701/209; 701/207; 711/204
(58) Field of Search ................................. 701/207, 209, 701/210, 211; 711/204; 340/988; 345/562

(56) References Cited

U.S. PATENT DOCUMENTS

| 4,393,443 | A | * | 7/1983 | Lewis | 364/200 |
|---|---|---|---|---|---|
| 5,325,486 | A | * | 6/1994 | Omori et al. | 395/164 |
| 5,918,246 | A | * | 6/1999 | Goodnow et al. | 711/137 |
| 5,983,158 | A | * | 11/1999 | Suzuki et al. | 701/209 |
| 6,457,097 | B1 | * | 9/2002 | Tamura | 711/113 |
| 6,460,097 | B1 | * | 10/2002 | Harumoto et al. | 710/60 |

FOREIGN PATENT DOCUMENTS

| JP | 4-70998 | 3/1992 |
|---|---|---|
| JP | 6-117866 | 4/1994 |
| JP | 9-96532 | 4/1997 |
| JP | 11-65430 A | 3/1999 |
| JP | 11-174952 | 7/1999 |
| WO | WO 99/34291 A1 | 7/1999 |

* cited by examiner

Primary Examiner—Tan Q. Nguyen
Assistant Examiner—Dalena Tran
(74) Attorney, Agent, or Firm—Birch, Stewart, Kolasch & Birch, LLP

(57) ABSTRACT

When map data necessary for route guiding is pre-read from a map recording medium 101, and accumulated in a data buffer, the quantity or the ratio of the pre-read data with respect to data required for the entire distance is notified by an image or a voice to a user. Thus, the user can know a progress in the pre-reading operation of the map data.

14 Claims, 5 Drawing Sheets

NAVIGATION APPARATUS

This application is the national phase under 35 U.S.C. § 371 of PCT International Application No. PCT/JP00/03699 which has an International filing date of Jun. 7, 2000, which designated the United States of America.

BACKGROUND OF THE INVENTION

1. Technical Field

The present invention relates to a navigation device for reading map data from a recording medium, searching a route to a destination based on the map data, and providing guiding along the route.

2. Background Art

The navigation device reads data on a road map from a predetermined recording medium, and data of accompanying road information, detects the current position by using a global positioning system (GPS), searching a route to a destination set by a user by a predetermined method such as Dijkstra method or the like, and then providing image or voice guiding along the searched route.

For example, a conventional navigation device disclosed in Japanese Patent Application Laid-open No. 9-96532 comprises: an external storage driving means for reproducing and storing a plurality of recording media including a map recording medium for recording map data, a music recording medium for recording music data, a video recording medium for recording video data, and so on; and a temporary storing means for temporarily storing data read by the external storage driving means. In this case, present processing is continued based on the data stored in the temporary storing means. If another function is requested, while the current processing is being executed, based on the read data, a recording medium is switched to another one, and the data recorded in the thus switched recording medium is read out by the external storage driving means, and a requested processing is executed based on the read data. Accordingly, the present processing and the requested processing can be executed simultaneously.

The foregoing configuration of the conventional navigation device enables processing such as route searching or the like, and pre-reading of map data necessary for route guiding, to be executed simultaneously. However, problems including the user's finding difficulty in knowing a progress in the pre-reading operation of map data and so on, have been inherent. Thus, for example, the pre-reading of map data up to a point, for which the user required route guiding, enabled a map recording medium to be switched to another recording medium. However, it was difficult for the user to determine whether or not the pre-reading to that point was finished.

The present invention was made to solve the foregoing problems, and it is an object of the invention to provide a navigation device for enabling the user to know a progress in the pre-reading operation of map data by notifying the quantity or ratio of the pre-read map data.

DISCLOSURE OF THE INVENTION

In accordance with the present invention, a navigation device is provided, comprising: a route search processing unit for searching a route to a destination based on map data; a pre-reading processing unit for pre-reading the map data necessary for route guiding from a recording medium; a route guiding processing unit for providing a guiding of the route to the destination based on the map data; a calculation unit for calculating a quantity or ratio of the map data pre-read by the pre-reading processing unit; and a notification unit for notifying the quantity or ratio of the map data pre-read by said pre-reading processing unit. This arrangement enables a user to know a progress in the pre-reading operation of the map data, and to instruct an interruption or a termination of the pre-reading when necessary. Thus, it is possible to enhance convenience.

According to the navigation device of the invention, as the map data necessary for route guiding, the pre-reading unit pre-reads map data on an area en route to the destination and a surrounding area thereof. Thus, even when a vehicle moves away from the searched route and enters a surrounding area, it is possible to continue the route guiding only based on the pre-read map data without needing any map recording media.

According to the navigation device of the invention, the calculation unit calculates a distance of a route to a pre-read area as a quantity of the pre-read map data. This arrangement enables the user to know how far the route guiding can be performed without any map recording media.

According to the navigation device of the invention, the calculation unit calculates a sum of distances between joints on the route as a distance on the route.

According to the navigation device of the invention, the calculation unit calculates a ratio of a distance of a route up to the pre-read area and a distance of a total route as a rate of the pre-read map data. This arrangement enables the user to know how far the route guiding can be performed without any map recording media.

According to the navigation device of the invention, the pre-reading processing unit pre-reads the map data necessary for route guiding during the period of non-reading of map data necessary at present. Thus, it is possible to execute pre-reading processing without interrupting the reading of map data necessary for currently executed processing.

According to the navigation device of the invention, the calculation unit calculates a quantity or ratio of map data from a starting point of the route to a pre-read point.

According to the navigation device of the invention, the calculation unit calculates a quantity or ratio of map data from a present position to a pre-read point.

According to the navigation device of the invention, the notification unit displays the quantity or ratio of the pre-read map data by numerical values. This arrangement enables the user to intuitively know how far the route guiding can be performed without any map recording media.

According to the navigation device of the invention, the notification unit displays the quantity or ratio of the pre-read map data by meters. This arrangement enables the user to intuitively know how far the route guiding can be performed without any map recording media.

According to the navigation device of the invention, the notification unit displays the quantity or ratio of the pre-read map data along the displayed route. This arrangement enables the user to intuitively know how far the route guiding can be performed without any map recording media.

According to the navigation device of the invention, the notification unit notifies the quantity or ratio of the pre-read map data by displaying map images different in color between a non pre-read area and a pre-read area. This arrangement enables the user to intuitively know how far the route guiding can be performed without any map recording media.

According to the navigation device of the invention, the notification unit uses an area of displaying the quantity or ratio of the pre-read map data for displaying other data during route searching by the route search processing unit. Thus, it is possible to effectively use the display screen of the display.

BEST MODES FOR CARRYING OUT THE INVENTION

Next, to provide detailed explanation of the present invention, the best modes of carrying out the invention will be described with reference to the accompanying drawings.

First Embodiment

Figure 1:
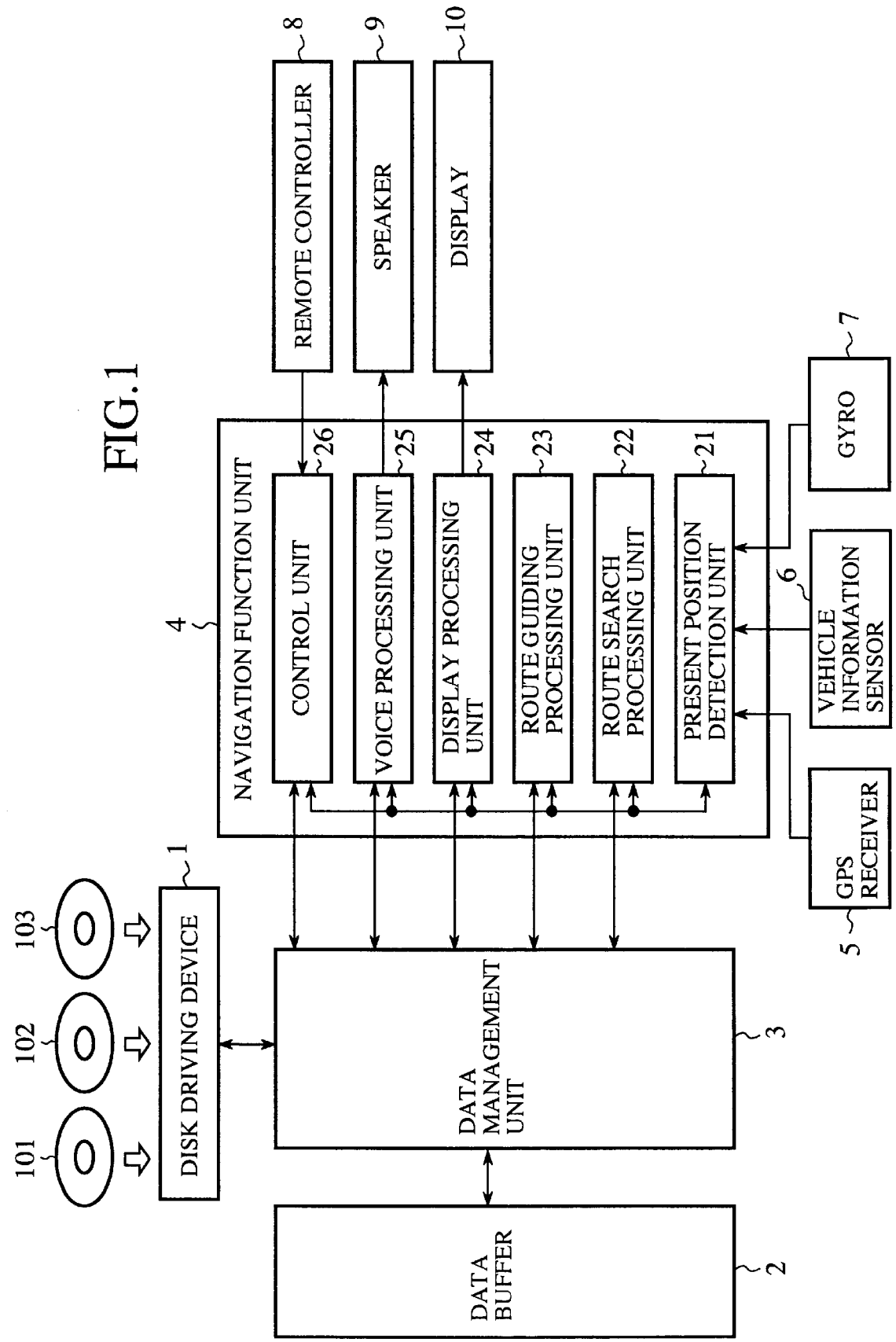
FIG. 1 is a block diagram showing the configuration of a navigation device according to a first embodiment of the present invention.
Figure 2:
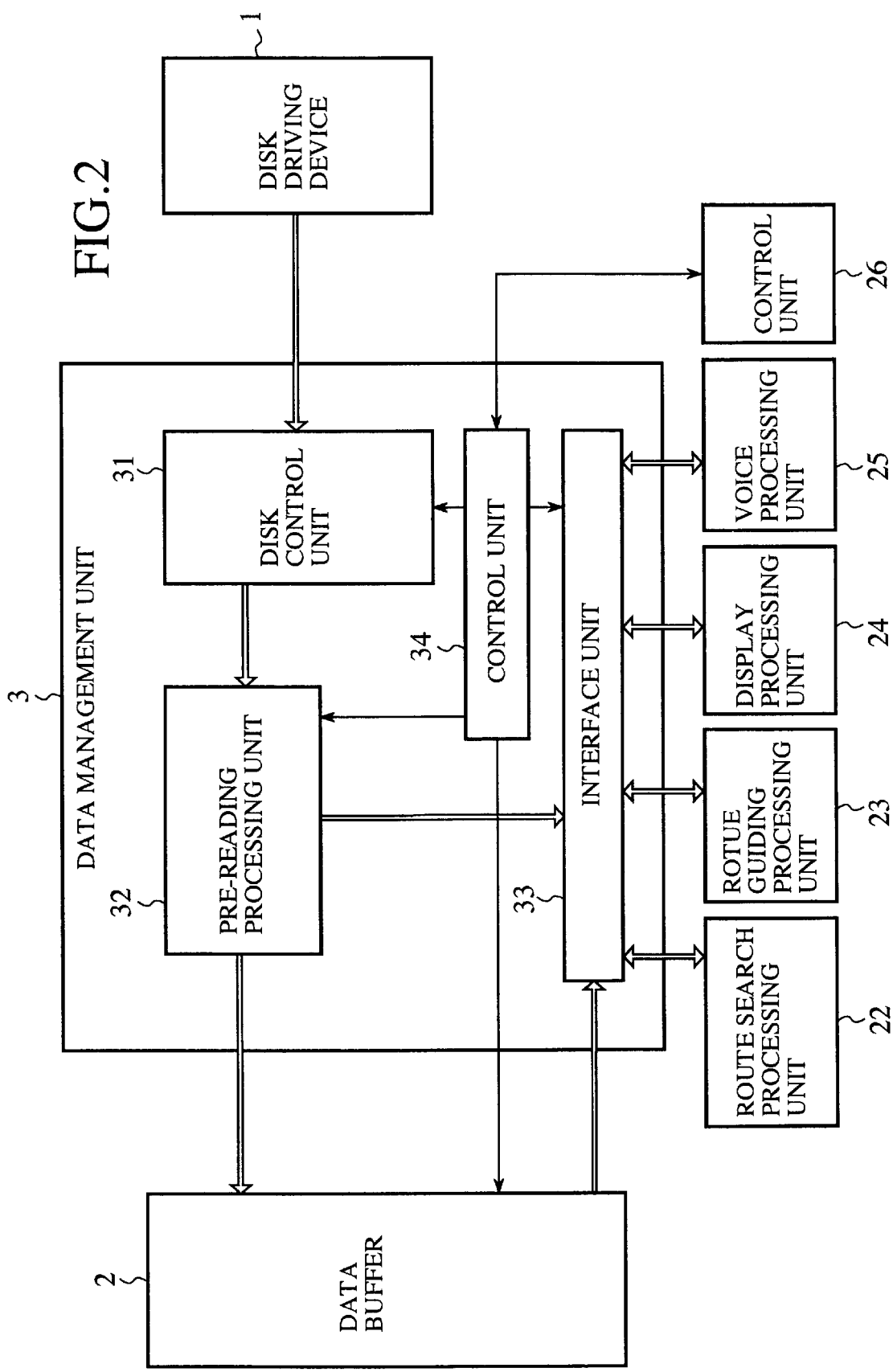
FIG. 2 is a block diagram showing the constitution of a data management unit shown in FIG. 1.

FIG. 1 is a block diagram showing the configuration of a navigation device according to the first embodiment of the invention; and FIG. 2 a block diagram showing the constitution of a data management unit 3 shown in FIG. 1.

In FIG. 1, reference numeral 1 denotes a disk driving device, which can be loaded with a compact disc-read only memory (CD-ROM) such as a map recording medium 101 for recording map data containing road map information, guiding information of each point, and so on, a music recording medium 102 for recording music data, a video recording medium 103 for recording video data or the like, or a digital versatile disc-read only memory (DVD-ROM), and reads data therefrom; and 2 denotes a data buffer for storing the pre-read map data.

Reference numeral 3 denotes a data management unit for managing various data in the manner of reading various data including map data, and so on, from the map recording medium 101 by controlling the disk driving device 1, and storing the pre-read map data in the data buffer 2.

The data management unit 3 shown in FIG. 2 includes the following components: a disk control unit 31 for reading data from a loaded recording medium by directly controlling the disk driving device 1; a pre-reading processing unit 32 for storing, among the data read by the disk control unit 31, map data to be pre-read into the data buffer 2, and supplying the other data to an interface unit 33; the interface unit 33 for supplying the data from the pre-reading processing unit 32 and the map data from the data buffer 2 to any one of a route search processing unit 22, a route guiding processing unit 23, a display processing unit 24, and a voice processing unit 25; and a control (calculation) unit 34 for controlling each unit in such a manner as to transfer and/or receive a control signal to and/or from a control signal with the control unit 26 of a navigation function unit 4, supplying a control signal for pre-reading to the pre-reading processing unit 32, supplying a control signal to the data buffer 2 for outputting, at a proper time, the map data pre-read and stored in the data buffer 2 in this case, and supplying a control signal for specifying the destination of data to the interface unit 33.

The navigation function unit denoted by 4 is provided to search, among various data managed by the data management unit 3, a route to a destination set by a user 35 based on the map data, generate a guiding image or voice for guiding the route, and reproduce voice or video data.

The navigation function unit 4 includes the following components: a present position detection unit 21 for detecting a present position based on bits of information obtained by a GPS receiver 5, a vehicle information sensor 6, and a gyro 7; a route search processing unit 22 for searching the route to the destination set by the user based on the detected present position; a route guiding processing unit 23 for generating data of a guiding image or voice for rough guiding of the searched entire route or guiding in the vicinity of the present position in the searched route based on the map data; a display processing unit 24 for receiving the guiding image data or video data, and image data indicating the quantity or ratio of the pre-read map data, and outputting an image signal corresponding to the supplied data to a display 10; a voice processing unit 25 for receiving guiding voice data or music data, and voice data indicating the quantity or ratio of the pre-read map data, and outputting a voice signal corresponding to the supplied data to a speaker 9; and a control unit 26 for executing each of various operations in accordance with a program pre-recorded in a not-shown read only memory (ROM) or the like, and controlling each unit and the data management unit 2 according to the operation of a remote controller 8 by the user.

Reference numeral 5 denotes a GPS receiver for receiving a radio wave from a GPS satellite; 6 denotes a vehicle information sensor for obtaining vehicle information such as a car speed; and 7 denotes a gyro. Reference numeral 8 denotes a remote controller for performing various operations by user; 9 denotes a speaker (notification unit) for outputting a voice corresponding to a voice signal from the voice processing unit 25, and 10 denotes a display (notification unit) for displaying an image corresponding to an image signal from the display processing unit 24.

Next, an operation will be described.

When the user sets a destination and instructs route guiding, the control unit 26 of the navigation function unit 4 starts a navigation service to the destination.

First, the control unit 26 of the navigation function unit 4 instructs the control unit 34 of the data management unit 3 to read, from the map recording medium 101, map data necessary for searching a rough route from a present position to the destination.

The control unit 34 of the data management unit 3 instructs the disk control unit 31 to read the map data, instructs the pre-reading processing unit 32 to supply the read map data to the interface unit 33, and then instructs the interface unit 33 to supply the received map data to the route search processing unit 22.

Accordingly, the map data necessary for searching the rough route from the present position to the destination is supplied from the map recording medium 101 to the route search processing unit 22 of the navigation function unit 4.

Upon having received the map data, the route search processing unit 22 of the navigation function unit 4 searches the rough route from the present position to the destination based on the map data. After the completion of the searching of the rough route from the present position to the destination, the route search processing unit 22 supplies the data of the rough route to the route guiding processing unit 23. Then, the route guiding processing unit 23 generates a guiding image data for guiding the rough route, supplies the data to the display processing unit 24, and displays the guiding image on the display 10.

The control unit 26 of the navigation function unit 4 instructs the control unit 34 of the data management unit 3 to pre-read detailed reduced-scale map data necessary for guiding at each point and accompanying data (e.g., data containing information about buildings around the road) from the map recording medium 101 when the vehicle travels ahead along the rough route. This instruction may be issued when the searching of the rough route is completed, or as one for pre-reading a route up to an already established point. By the instruction for pre-reading the established point, the searching of the rough route and the pre-reading of the map data are executed simultaneously. That is, the pre-reading processing unit 31 pre-reads the map data necessary for route guiding from the map recording medium 101 in the period of non-reading of map data necessary at present.

The control unit 34 of the data management unit 3 instructs the reading of map data to the disk control unit 3, and then instructs the pre-reading processing unit 32 to pre-read and store the read map data in the data buffer 2.

Accordingly, the detailed reduced-scale map data necessary for guiding when the vehicle travels ahead along the rough route, and the accompanying data thereof are sequentially pre-read along the rough route and stored in the data buffer 2.

In this case, the control unit 34 of the data management unit 3 notifies the quantity of the map data, whose pre-reading has been completed, or the ratio of the map data, whose pre-reading has been completed, to all the map data to be pre-read, to the control unit 26 of the navigation function unit 4 at proper time. For the quantity of map data, the pre-reading thereof having been completed, the quantity of map data from the starting point of the route to a point already pre-read, or the quantity of map data from the present position to the point already pre-read may be used. These can be selective. Upon having received the quantity or ratio of the map data, whose pre-reading has been completed, the control unit 26 of the navigation function unit 4 generates an image data for notifying the quantity or ratio of the map data, whose pre-reading has been completed, and supplies the thus made image data to the display processing unit 24, and then displays the image on the display 10. When notification is executed by a voice, the control unit 26 of the navigation function unit 4 receives the quantity or ratio of the pre-read map data, then generates voice data for notifying the quantity or ratio of the pre-read map data, and supplies the thus made voice data to the voice processing unit 25, and then outputs the voice to the speaker 9.

Then, the user knows a progress in the pre-reading operation by the image or the voice, and instructs the pre-reading operation to be interrupted or terminated by a manual operation of the remote controller 8. Thus, the recording medium can be switched to another one.

After the end of the pre-reading, the map recording medium 101 for route guiding is no longer necessary. Thus, the map recording medium 101 loaded in the disk driving device 1 can be switched to another recording medium.

In addition, after the end of the pre-reading, the control unit 26 of the navigation function unit 4 instructs the control unit 34 of the data management unit 3 to supply the map data stored in the data buffer 2 to the route guiding processing unit 23. The control unit 34 instructs the data buffer 2 to supply the pre-read map data to the interface unit 33, and then instructs the interface unit 33 to supply the map data to the route guiding processing unit 23. Accordingly, the map data pre-read and stored in the data buffer 2 is supplied to the route guiding processing unit 23 as occasion demands.

The route guiding processing unit 23 generates image or voice data for guiding around the present position based on the map data, supplies the image data to the display processing unit 24, and displays the image on the display 10. The voice data is supplied to the voice processing unit 25, and the voice is outputted to the speaker 9.

The route guiding is performed by repeating the foregoing processing until the vehicle reaches the destination.

Since the route guiding is executed based on the pre-read map data, after the completion of pre-reading, the user can enjoy music or a video by switching a recording medium to, for example the music recording medium 102 or the video recording medium 103 while receiving route guiding.

In this case, based on the operation by the user, the control unit 26 of the navigation function unit 4 instructs the control unit 34 of the data management unit 3 to read the music data or the video data. The control unit 34 of the data management unit 3 instructs the disk control unit 31 to read the music data or the video data. The pre-reading processing unit 32 is instructed to directly supply the music data or the video data to the interface unit 33. Then, the interface unit 33 is instructed to supply, among such data, the image data to the display processing unit 24, and the voice data to the voice processing unit 25. Subsequently, the display processing unit 24 of the navigation function unit 4 displays an image corresponding to the image data on the display 10, and the voice processing unit 25 outputs a voice corresponding to the voice data to the speaker 9. The image of the route guiding and the image of the video data are simultaneously displayed on the display 10 by, for example dividing the screen. In addition, the image of the route guiding may be displayed by being superposed on the image of the video data only when the image of the route guiding is displayed.

As described above, according to the first embodiment, the quantity or ratio of the pre-read map data for route guiding is notified. Thus, the user can know a progress in the pre-reading operation of the map data, and instruct the pre-reading operation to be interrupted or terminated as occasion demands. It is therefore possible to enhance convenience.

Moreover, according to the first embodiment, the map data necessary for route guiding is pre-read from the map recording medium 101 in the period of non-reading of map data necessary at present. Thus, it is possible to execute pre-reading processing without interrupting the reading of map data for currently executed processing.

Second Embodiment

Figure 3:
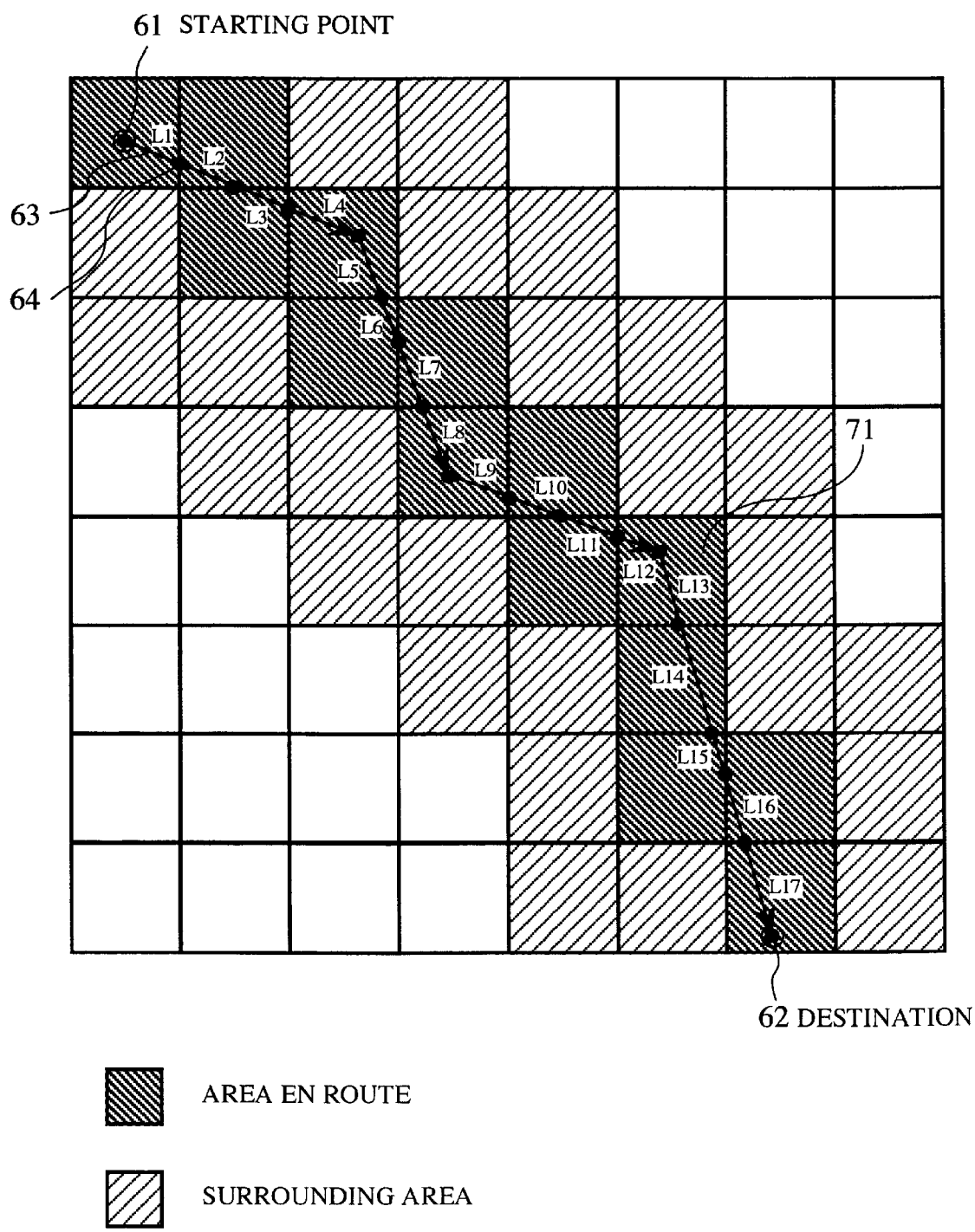
FIG. 3 is a view illustrating the calculation as to a progress in the pre-reading operation of map data in a navigation device according to a second embodiment of the invention.

FIG. 3 is a view illustrating the calculation regarding the progress in the pre-reading operation of map data in a navigation device according to the second embodiment of the invention.

According to the second embodiment, the control unit 34 of the data management unit 3 instructs the disk control unit 31 and the pre-reading processing unit 32 to pre-read map data of an area en route to the destination, and its surrounding area as map data necessary for route guiding. In the map recording medium 101, a wide area has been divided into areas of predetermined sizes, and map data has been recorded for each area.

In addition, according to the second embodiment, the control unit 34 of the data management unit 3 calculates the distance of a route up to the pre-read area as a quantity of pre-read map data. In this case, for example as shown in FIG. 3, the control unit 34 calculates a sum of distances between joints 64 on the route as a distance on the route. For example, in FIG. 3, assuming that pre-reading up to an area 71 en route to the destination has been completed, a total sum of lengths L1 to L13 of a road link 63 from a starting point 61 to a joint near the destination 62 of the area 71 is calculated as a value to represent the quantity of the pre-read map data.

Moreover, according to the second embodiment, the control unit 34 of the data management unit 3 calculates a ratio of the distance of a route up to the pre-read area and the distance of the entire route as a ratio of the pre-read map data. For example, in FIG. 3, assuming that pre-reading up to the area 71 en route to the destination has been completed, a ratio between a total sum of lengths L1 to L13 of the road link 63 from the starting point 61 to the joint near the destination 62 of the area 71 and the distance L of the entire route (=L1+ . . . +L17) is calculated as a ratio of the pre-read map data.

Other operations are similar to those of the navigation device of the first embodiment, and thus description thereof will be omitted.

As described above, according to the second embodiment, as map data necessary for route guiding, the map data of the area en route to the destination and its surrounding area are pre-read. Thus, even when the vehicle moves away from the searched route and enters a surrounding area, it is possible to continue route guiding only based on the pre-read map data without needing the map recording medium 101.

In addition, according to the second embodiment, the distance of a route up to the pre-read area is calculated as the quantity of pre-read map data. This arrangement enables the user to know how far the route guiding can be performed without the map recording medium 101.

Furthermore, according to the second embodiment, a ratio between the distance of the route up to the pre-read area and the distance of the entire route is calculated as a ratio of pre-read map data. This arrangement enables the user to know how far the route guiding can be performed without the map recording medium 101.

Third Embodiment

Figure 4:
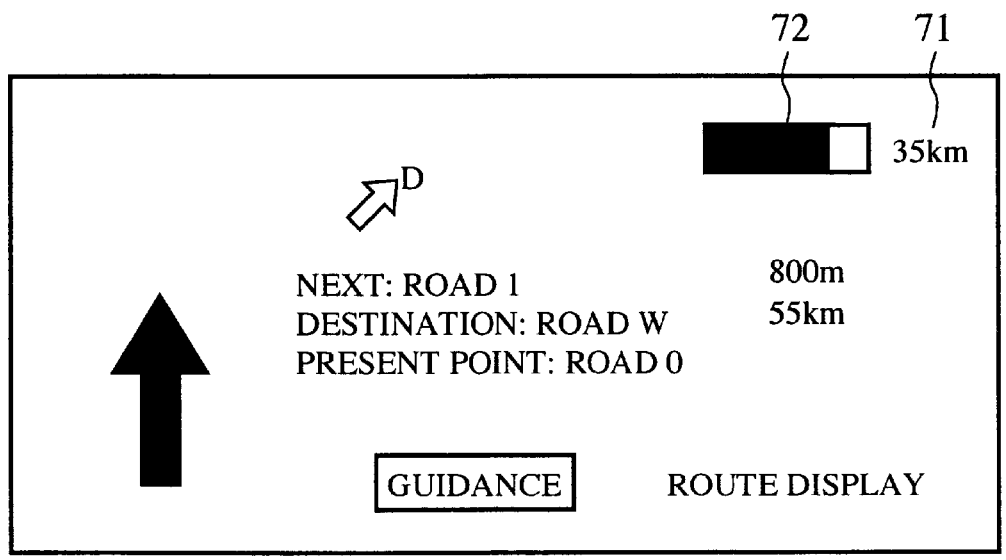
FIG. 4 is a view showing an example of displaying regarding a progress in pre-reading of map data in a navigation device according to a third embodiment of the invention.

FIG. 4 shows an example of displaying regarding the progress in the pre-reading operation of map data in a navigation device according to the third embodiment of the invention.

According to the third embodiment, upon having received the quantity or ratio of map data, whose pre-reading operation has been completed, for example as shown in FIG. 4, the control unit 26 of the navigation function unit 4 generates image data of a numerical value 71 (35 km in the described case) for notifying the quantity of the pre-read map data, and image data of a meter 72 indicative of the ratio of the pre-read map data, and supplies these data to the display processing unit 24. Then, the images thereof are displayed on predetermined display areas of the display 10.

Other operations are similar to those of the first embodiment, and thus description thereof will be omitted.

As described above, according to the third embodiment, the quantity or ratio of the pre-read map data is displayed by the numerical value 71 or the meter 72. This arrangement enables the user to intuitively know how far route guiding can be performed without the map recording medium 101.

Figure 6:
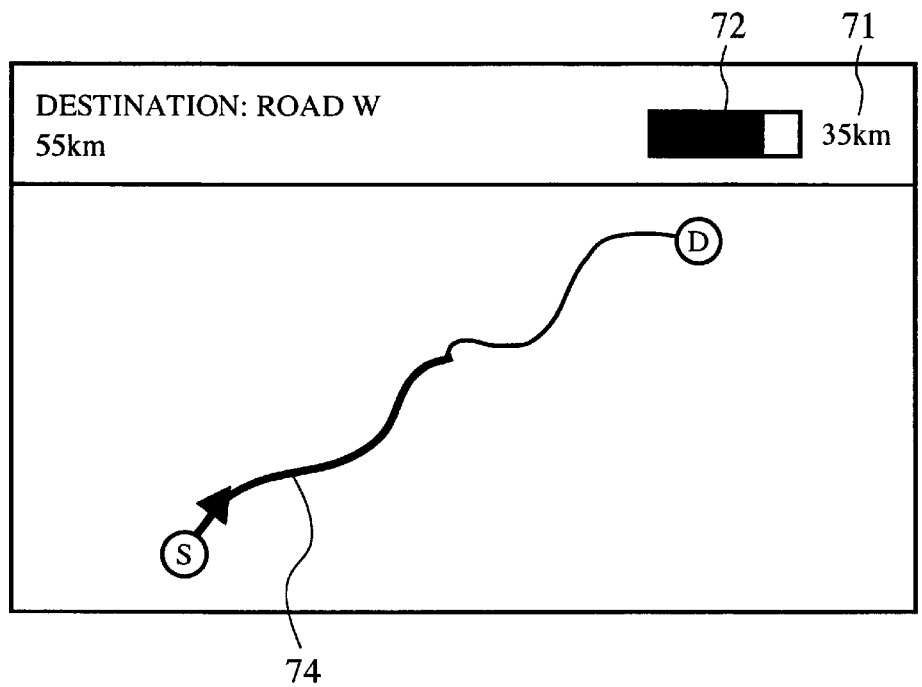
FIG. 6 is a view showing an example of displaying regarding a progress in pre-reading of map data in a navigation device according to a fourth embodiment of the invention.

FIG. 6 shows an example of displaying regarding the progress in the pre-reading operation of map data in the navigation device according to the fourth embodiment of the invention.

Fourth Embodiment

According to the fourth embodiment, upon having received the quantity or ratio of map data, whose pre-reading operation has been completed, for example as shown in FIG. 6, in order to notify the quantity of the pre-read map data, along the image of a searched route, the control unit 26 of the navigation function unit 4 generates image data of a line 74 different from the route image in color and thickness, indicative of the quantity of the pre-read map data, and supplies the image data to the display processing unit 24, and then the image is displayed in a predetermined display area of the display screen of the display 10.

Other operations are similar to those of the first embodiment, and thus description thereof will be omitted.

As described above, according to the fourth embodiment, the quantity or ratio of the pre-read map data is displayed along the displaying of the route. This arrangement enables the user to intuitively know how far route guiding can be performed without the map recording medium 101.

Figure 5:
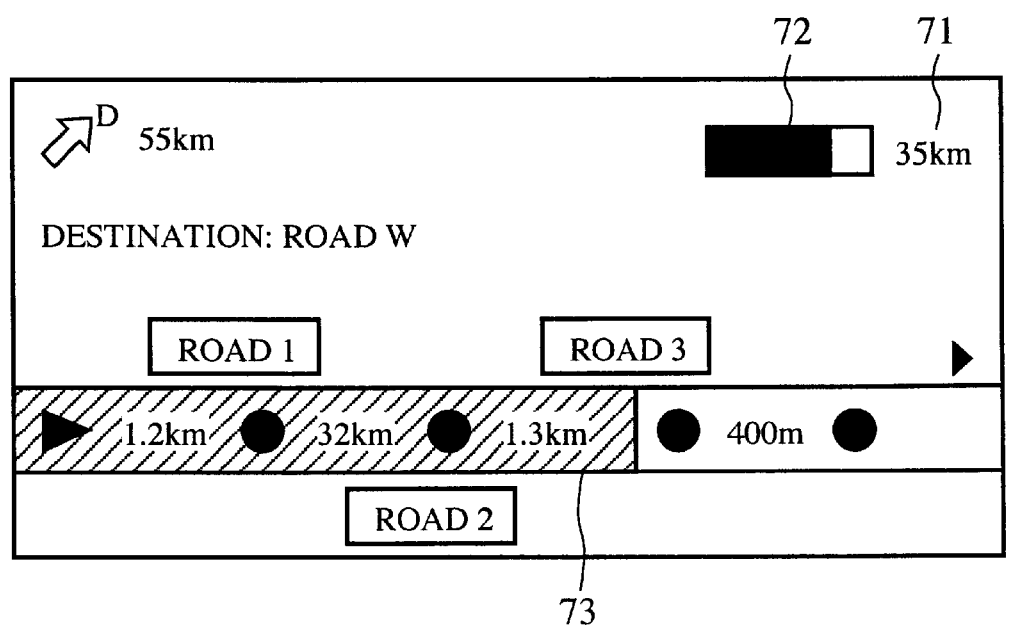
FIG. 5 is a view showing an example of displaying regarding a progress in pre-reading of map data in a navigation device according to a fifth embodiment of the invention.

FIG. 5 shows an example of displaying regarding the progress in the pre-reading of map data in a navigation device according to the fifth embodiment of the invention.

Fifth Embodiment

According to the fifth embodiment, the route guiding processing unit 23 of the navigation function unit 4 generates data of a route outline image indicative of a distance between main points, and supplies the data to the display processing unit 24, and then the image is displayed on the display 10. Upon having received the quantity or ratio of map data, whose pre-reading operation has been completed, for example as shown in FIG. 5, in order to notify the quantity of the pre-read map data, the control unit 26 generates data of an image of a bar 73 indicative of the quantity or rate ratio of the pre-read map data, and supplies the image to the display processing unit 24. Then, the image is displayed by being superposed on the route outline image displayed on the display 10.

Other operations are similar to those of the first embodiment, and thus description thereof will be omitted.

As described above, according to the fifth embodiment, the quantity or ratio of the pre-read map data is displayed along the displaying of the route (route outline image in the described case). This arrangement enables the user to intuitively know how far the route guiding can be performed without the map recording medium 101.

Sixth Embodiment

Figure 7:
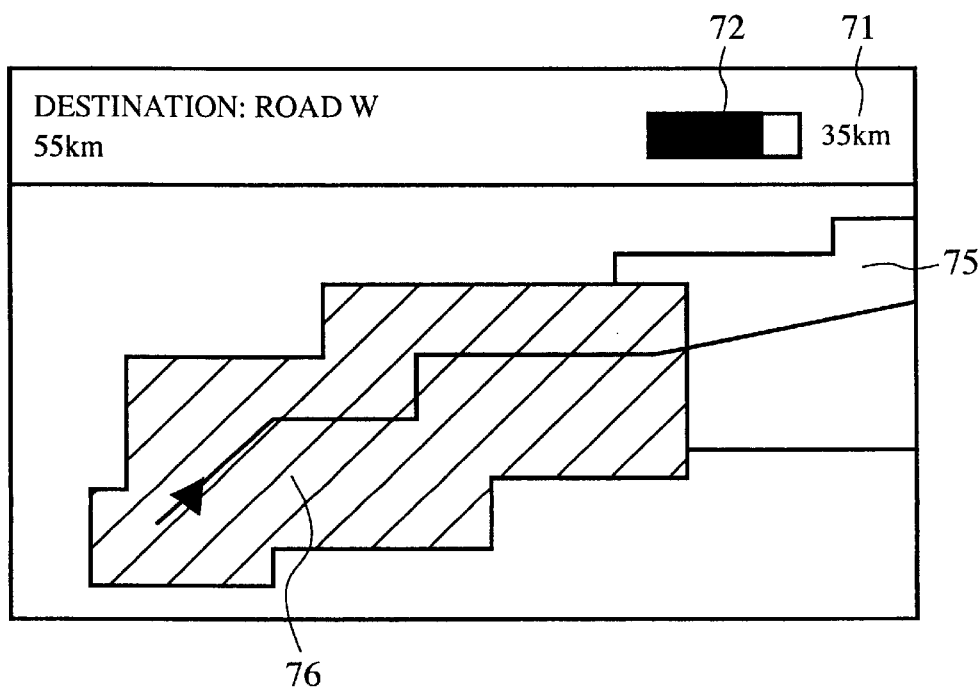
FIG. 7 is a view showing an example of displaying regarding a progress in pre-reading of map data in a navigation device according to a sixth embodiment of the invention.

FIG. 7 shows an example of displaying regarding the progress in the pre-reading operation of map data in a navigation device according to the sixth embodiment of the invention.

According to the sixth embodiment, for example as shown in FIG. 7, the control unit 26 of the navigation function unit 4 instructs the route guiding processing unit 23 to generate data of map images different in color between a non pre-read area 75 and a pre-read area 76, and supply the data to the display processing unit 24. Then, the map images are displayed on the display 10.

Other operations are similar to those of the first embodiment, and thus description thereof will be omitted.

As described above, according to the sixth embodiment, the quantity or ratio of the pre-read map data is notified by displaying the map images different in color between the non pre-read area 75 and the pre-read area 76. This arrangement enables the user to intuitively know how far the route guiding can be performed without the map recording medium 10.

In the foregoing embodiments, for example, during route searching by the route search processing unit 22, it is not necessary to display the quantity or ratio of the pre-read map data. Accordingly, the display area for displaying the quantity or ratio of the pre-read map data may be used for displaying other data. Therefore, it is possible to effectively use the display screen of the display 10.

Industrial Applicability

As apparent from the foregoing description, the navigation device loaded on a vehicle is suitably used for providing route guiding to a driver.

What is claimed is:

1. A navigation device, comprising:

a first control unit for setting a first position and a second position;

a second control unit for reading first map data for searching a rough route from the first position to the second position from a recording medium;

a route search processing unit for searching the rough route from the first position to the second position based on the read first map data;

a pre-reading processing unit for pre-reading second map data, necessary for displaying a detailed map, from the recording medium;

a data buffer for storing the pre-read second map data;

a route guiding processing unit for providing a route guiding to the second position based on the stored pre-read second map data;

a calculation unit for calculating at least one of a quantity of the stored pre-read second map data, indicative of a range of the route guiding that said route guiding processing unit can provide by using the stored pre-read second map data, and a ratio of the stored pre-read second map data, indicative of an amount of the stored pre-read second map data with respect to an amount of the second map data required to guide from the first position to the second position; and a notification unit for notifying at least one of the calculated quantity and the calculated ratio.

2. The navigation device according to claim 1, wherein as the second map data necessary for the route guiding, said pre-reading processing unit pre-reads the second map data including an area en route to the second position and a surrounding area thereof.

3. The navigation device according to claim 1, wherein said calculation unit calculates a distance of a route to a pre-read area as the quantity of the stored pre-read second map data.

4. The navigation device according to claim 3, wherein said calculation unit calculates a sum of distances between joints on the route as a distance on the route.

5. The navigation device according to claim 1, wherein said pre-reading processing unit pre-reads the second map data when reading of the first map data is not necessary.

6. The navigation device according to claim 1, wherein said calculation unit calculates said at least one of the quantity and the ratio rate from a starting point of the route to a pre-read point.

7. The navigation device according to claim 1, wherein said calculation unit calculates said at least one of the quantity and the ratio rate from a present position to a pre-read point.

8. The navigation device according to claim 1, wherein said notification unit displays said at least one of the quantity and the ratio by numerical values.

9. The navigation device according to claim 1, wherein said notification unit displays said at least one of the quantity and the ratio by meters.

10. The navigation device according to claim 1, wherein said notification unit displays said at least one of the quantity and the ratio along the displayed route.

11. The navigation device according to claim 1, wherein said notification unit notifies said at least one of the quantity and the ratio by displaying map images between a non pre-read area and a pre-read area by using different colors.

12. The navigation device according to claim 1, wherein said notification unit uses an area of displaying said at least one of the quantity and the ratio for displaying other data during route searching by said route search processing unit.

13. The navigation device according to claim 1, wherein said first position is a present position.

14. The navigation device according to claim 1, wherein said second position is a destination.

* * * * *